Jan. 2, 1968     E. A. PLACKE     3,361,959
WEAR RESISTANT MAGNETIC INSPECTION APPARATUS
Original Filed Nov. 9, 1962     4 Sheets-Sheet 1
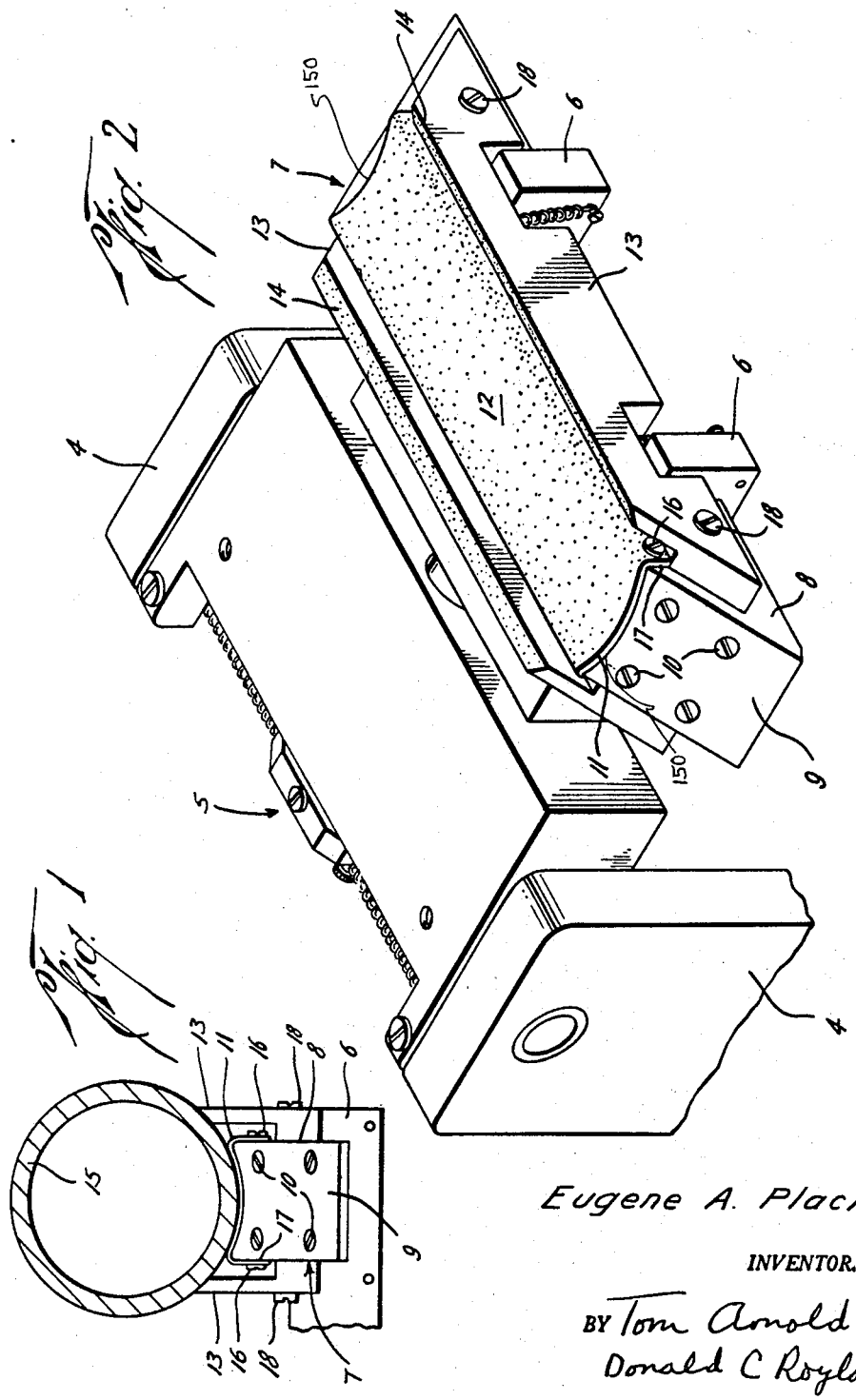
Eugene A. Placke
INVENTOR.
BY Tom Arnold
Donald C. Roylance
ATTORNEY Jan. 2, 1968     E. A. PLACKE     3,361,959
WEAR RESISTANT MAGNETIC INSPECTION APPARATUS
Original Filed Nov. 9, 1962     4 Sheets-Sheet 2
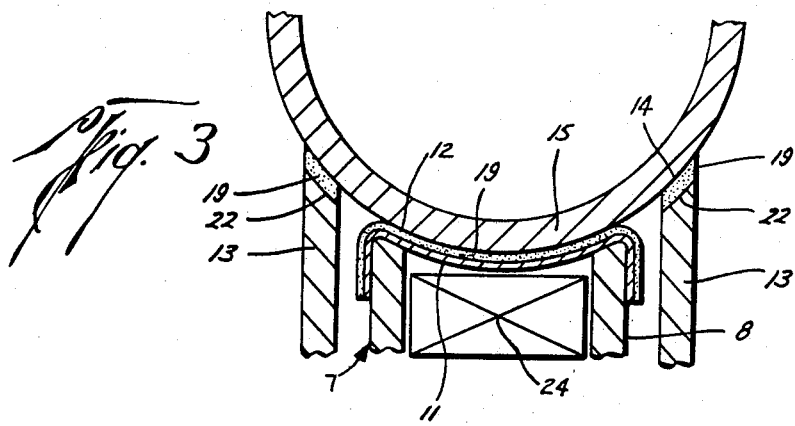
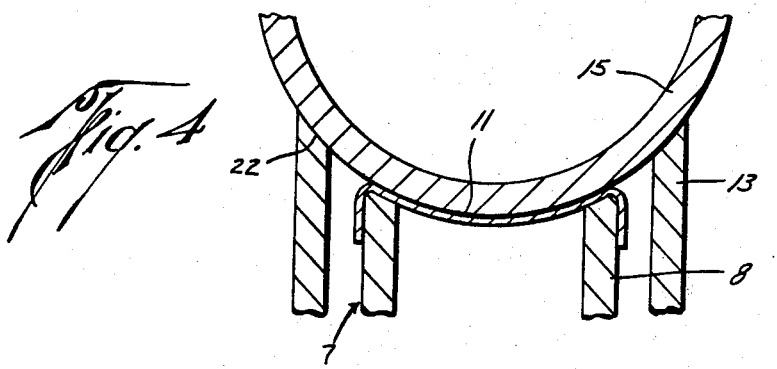
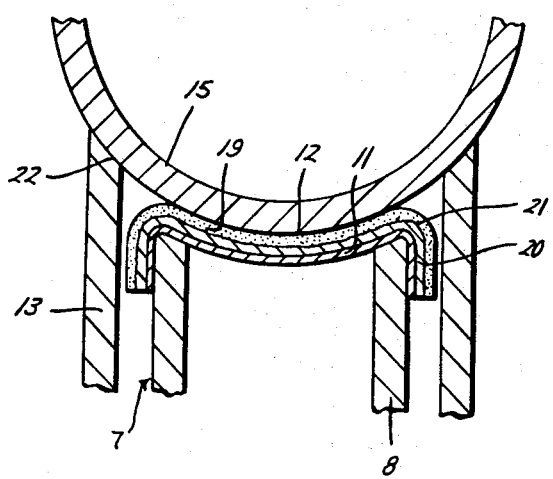
Eugene A. Placke
INVENTOR.
BY Tom Arnold
Donald C. Roylance
ATTORNEY Jan. 2, 1968  E. A. PLACKE  3,361,959
WEAR RESISTANT MAGNETIC INSPECTION APPARATUS
Original Filed Nov. 9, 1962  4 Sheets-Sheet 3
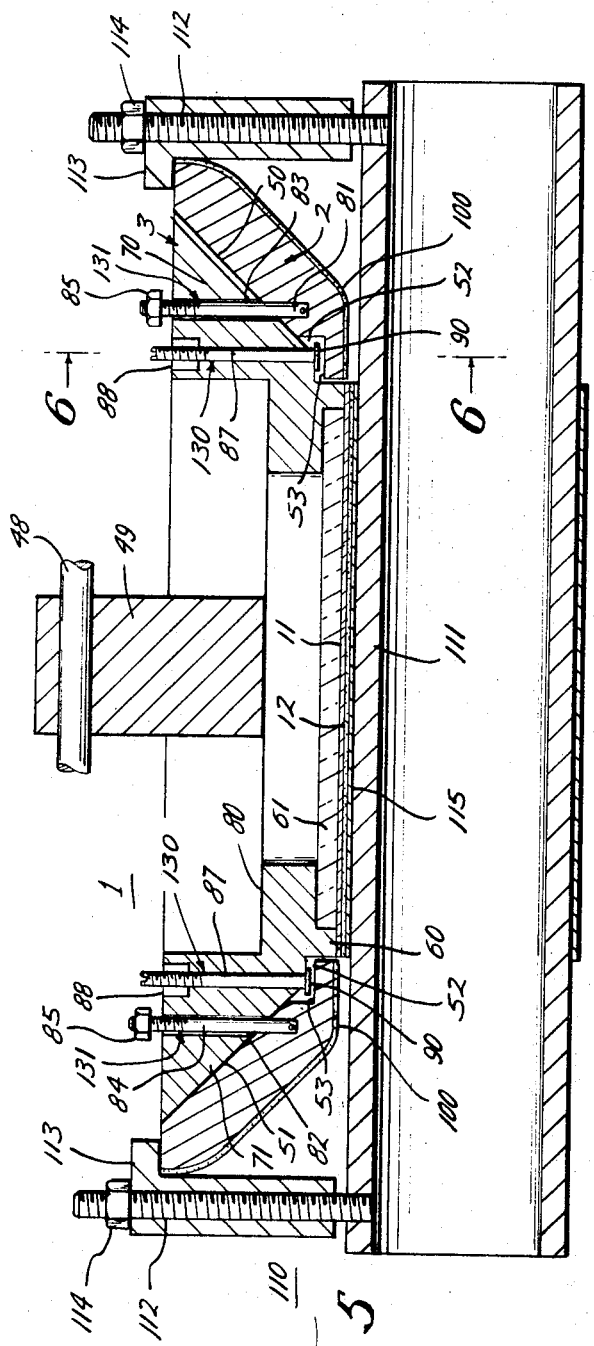
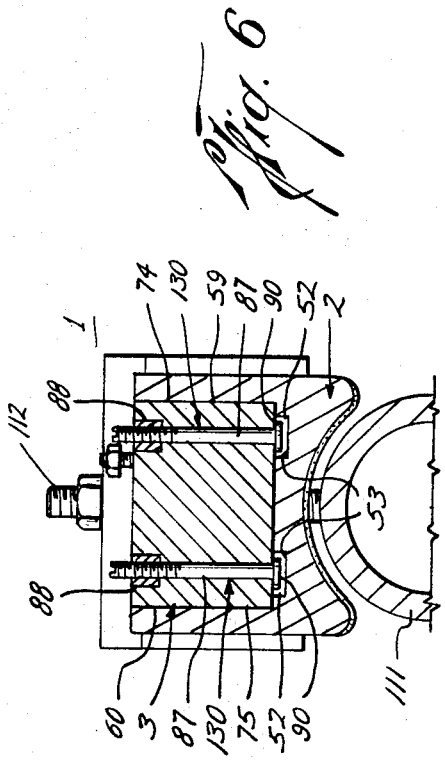
Eugene A. Placke
INVENTOR.
BY Arnold and Roylance
ATTORNEYS

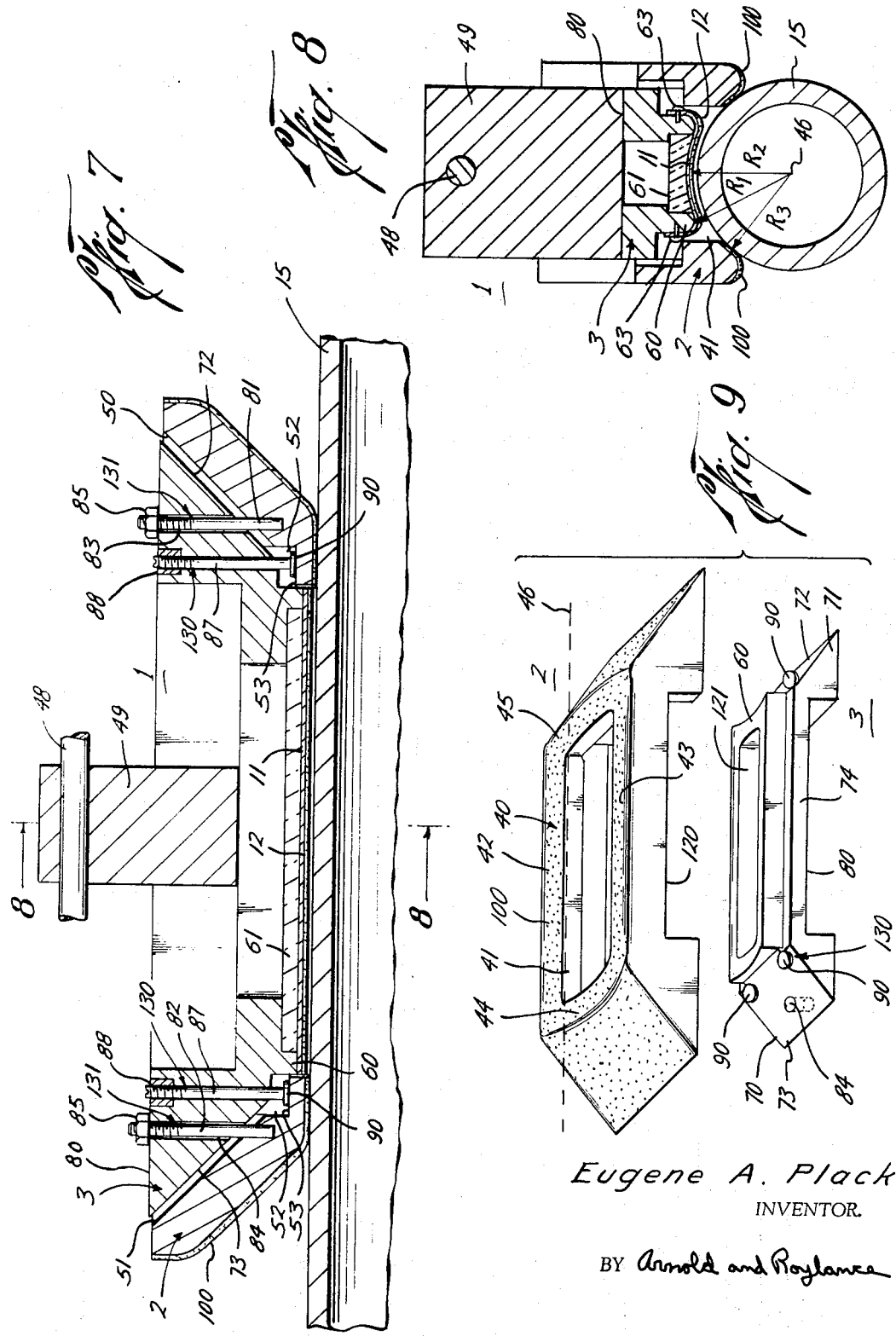

United States Patent Office 3,361,959
Patented Jan. 2, 1968

3,361,959
WEAR RESISTANT MAGNETIC INSPECTION
APPARATUS
Eugene A. Placke, Houston, Tex., assignor, by mesne assignments, to American Machine & Foundry Company, New York, N.Y., a corporation of New Jersey
Continuation of application Ser. No. 236,586, Nov. 9, 1962. This application Dec. 23, 1965, Ser. No. 523,001
10 Claims. (Cl. 324—37)

This application is a continuation of application Ser. No. 236,586, filed Nov. 9, 1962, now abandoned, which in turn was a continuation-in-part of application Ser. No. 47,447, filed Aug. 4, 1960, now abandoned.

This invention relates to devices for the inspection of elongated members and more particularly to a long wearing detector shoe for scanning the surface of such members.

In the manufacture and use of various elongated members such as drill pipe, tubing, casing, or the like, it is often desired to inspect the member either during, after or in advance of use, to determine for example, whether the member contains any structural flaws. Many of the methods for conducting such inspections involve scanning of the surface of the member by passing a search shoe thereover or by passing the member over a search shoe. Typical of such methods are those which establish a predetermined magnetic flux in the member to be inspected and then scan the surface of the member with a search coil to detect any variation in flux pattern and hence the presence of structural flaws. Typical of such methods and means for carrying out such an inspection procedure are those disclosed in U.S. Patent No. 2,650,344, issued to D. Lloyd, Aug. 25, 1953, and U.S. Patent No. 2,881,387, to Wood, Apr. 7, 1959, and U.S. Patent No. 2,882,448, to Price et al., Apr. 14, 1959.

However the accuracy of such inspection procedures depends upon maintaining relatively close and constant positional alignment between the search shoe, i.e., the detection element (transducer or the like) carried by the search shoe and the member being scanned thereby. Accordingly, search shoe-against-member-being-inspected force must be applied throughout the scanning procedure and may be conveniently obtained by either imposing a load upon the search shoe when it is passed over the member being inspected, or by disposing the weight of the member being inspected upon the search shoe when the member is passed over the search shoe. Thus, while the maintenance of this important shoe-against-member-load has insured accuracy, it has also presented a long standing problem, i.e., an all too rapid wearing out of the scanning surface of the search shoe.

In inspection of a ferromagnetic pipe with an electromagnetic detection device, such as a search coil responsive to magnetic flux in the pipe, the scanning surface is a thin shim or top plate made from a non-magnetic material that cannot take much wear without disintegrating. Thus, in the inspection of drill pipe or the like, where the pipe surface is rough or carries abrasives, such as sand or grit, the shim or top plate will wear out in a short time if all the shoe-against-member-being-inspected force is applied to the shim or top plate.

It is therefore an object of the present invention to provide the scanning surface of search shoes with an extended life by making the same more wear resistant.

It is another object of this invention to provide such search shoes with ancillary means for bearing some of the shoe-against-member force, to thereby reduce the wear imposed upon the scanning surface of the shoe by said force, without obviating the essential positional alignment of the shoe and the member being inspected which is achieved by that force.

Another object of the present invention is to reduce the wear of the scanning surface of a search shoe by providing means to adjust the position of the scanning surface with respect to ancillary means for bearing some of the shoe-against-member force, without altering the essential positional alignment of the search shoe and the member being inspected.

A still further object of the present invention is to provide a search shoe having a movable holder for containing the detection member and an overlying wear resistance shim as the scanning surface, wherein the holder can be locked in a number of positions in a frame of unitary construction having a wear resistant load bearing surface to reduce the shoe-against-member force acting on the shim.

In the drawings:

FIGURE 1 is an end view of one form of a search shoe embodying the invention and carrying a tubular member in inspecting relation.

FIGURE 2 is an enlarged isometric of the search shoe of FIGURE 1 showing certain features of the invention and also showing one manner in which the search shoe may be conveniently mounted.

FIG. 3 is an enlarged fragmentary cross-section taken in the middle of the shoe in FIGURE 2.

FIGURE 4 illustrates a variation of the embodiment illustrated in FIGURE 3.

FIGURE 4A illustrates a variation of the embodiment illustrated in FIGURE 3.

FIGURE 5 is a longitudinal cross-section view in elevation of another form of search shoe in accordance with the present invention, showing the detection element holder in an unlocked position on a jig.

FIGURE 6 is a cross-sectional view in elevation along the lines 6—6 of FIGURE 5.

FIGURE 7 is a longitudinal cross-section view in elevation of the search shoe embodiment of FIGURES 5 and 6 (along the same section line as shown in FIGURE 5), showing the detection element holder in a fully locked position and the search shoe disposed in inspection relation on a tubular pipe (shown in fragmentary form).

FIGURE 8 is a cross-sectional view in elevation along the lines 8—8 of FIGURE 7.

FIGURE 9 is a perspective view of the guide body and detection element holder of the embodiment shown in FIGURES 5 through 8.

With continued reference to the drawings:

The present invention is illustrated in this specification as applied to a pipe of circular configuration. It is understood that other types and configurations of members can be inspected using a search shoe arranged in accordance with the present invention.

In the embodiment of the invention illustrated in the accompanying drawings, means are provided for supporting the search shoe in position for scanning the surface of an elongated member such as a pipe. Such means conveniently takes the form of a frame 4 (FIGURE 2) which carries a mounting assembly generally indicated as 5 which in turn suspends a yoke member 6 to which a search shoe generally indicated by reference numeral 7 is secured.

Search shoe 7 comprises an elongated body member 8 which carries a detection element, such as a plurality of search coils schematically shown at reference numeral 24 (FIG. 3). Search shoe 7 is then conveniently closed at both ends as by means of plates 9 which are secured to body 8 as by means of screws or bolts 10. Overlying the top of body 8, which would otherwise be open to expose search coils 24 which are mounted therein, is a cylindrically arced search shoe scanning member or shim 11, having a hard, smooth wear resistant scanning surface 12. Shim 11 is then provided with a pair of downwardly extending flanged edge portions 17 which are conveniently an integral part of shim 11 and by means of which shim 11 may be conveniently secured to body 8 as with bolts 16. The plate 9 can be extended to cover the side edge 150 of shim 11 to prevent dirt from entering behind shim 11 and to eliminate uneven wear.

Various means for resiliently urging the search shoe 7 into scanning contact with the tube 15 being inspected may be used, such as that illustrated in Price et al., 2,882,448. This shoe-to-member of scanning contact force between tube 15 and shoe 7 may, for example, be spring or gravity derived, but it is preferably of moderate magnitude so as to produce minimum friction and wear upon the search shoe 7.

Body 8 then conveniently carries a pair of tube abutting members such as outriggers 13 which are secured to the sides of body 8 as by means of bolts 18. As shown in FIGURE 3, outriggers 13 then extend upwardly along the side walls of body 8 to terminate in hard surfaces 14 (FIGURE 2) disposed in spaced relation to shim 11 and lying just within the cylindrically curved plane defined by surface 12 of shim 11. Thus, as also shown in FIGURE 3, when an elongated member, as for example tube 15 is scanned by search shoe 7 being slidably passed over the surface of the tube 15, the positional relation of shim scanning surface 12 to outrigger surfaces 14 is such that outrigger 13 effects an almost-separation of tube 15 and shim 11 thereby shifting some of the wear producing shoe-against-tube force from the shim to the outriggers without losing the important shoe-to-tube positioning which that same force provides. The shim surface 12 may be slightly separated from the elongated member initially and the gradual wearing away of the outrigger surfaces 14 and eventually causes the shim surface 12 to contact the elongated member and the shim 11 receives increased but less than the full shoe-to-tube force.

The outriggers 13 also help to reduce wear of shim 11 particularly during bouncing about of the parts as often occurs in rapid operation, and, in addition, scrapes and smoothes the tube surface to be inspected before it is scanned by the shim itself.

It is apparent that members having other configurations can be inspected using the same basis combination of the shim and outriggers to reduce the wear on the shim. The outrigger surfaces 14 and shim surface 12 can be shaped to conform to a particular member configuration, an elliptical or square configuration, for example, with the outriggers assuming at least a portion of the shoe-against-member force and maintaining alignment of the search shoe and member. Alternatively, a large flat plate can be inspected with the outriggers reducing the shim wear without appreciably aligning the search shoe.

While the present invention contemplates extending the wearability of search shoes by providing load bearing tube abutting members, it also contemplates the provision of search shoes having a highly wear resistant surface, such as surface 12 of shim 11, and highly wear resistant surfaces for the load bearing tube abutting members such as surfaces 14 of outriggers 13.

As appears in FIGURES 3 and 4A, the wear resistant surfaces on both the outriggers 13 and the shim 11 may comprise a highly wear resistant coating 19, as for example a ceramic coating such as ceramic aluminum oxide, ceramic zirconium silicates, ceramic chrome oxide, tungsten carbide, or the like. The wear resistant coating 19 can be placed directly on the outriggers 13 and shim 11 or an intervening bonding lamina 20 can be used, as shown in FIGURE 4A, in accordance with well-known techniques.

The wear-resistant coating 19 initially has a general surface configuration resembling a multitude of hills and valleys. Consequently, the first wearing action when the search shoe is in operation will reduce the crests of the hills rather rapidly and more gradual wear will then commence. The more rapid initial wear adds further to the desirability of initially having the cylindrical plane of the outrigger surfaces 14 slightly inside the cylindrical plane of the shim surface 12, thereby further prolonging the life of shim 11. For example, the search shoe 7 illustrated in FIG. 3 may initially have the outriggers 13 arranged to position the cylindrical plane of the outrigger coating surface 14 just inside, above as viewed in FIGURE 3, the cylindrical plane of the shim coating surface 12. The tube 15 may almost separate from the shim coating surface 12. After some use, both the outrigger coating surface 14 and shim coating surface 12 will be in substantial full contact with tube 15, and the surface of outrigger coating 19 and shim coating 12 will gradually wear away together. An important fact being that both the shim coating surface 12 wears much slower when the outrigger wear resistant coating 19 is used and the shim 11 has an appreciably longer life than if the inspected tube was in direct contact with the shim 11 without the wear resistant coating 19 on outriggers 13.

From the foregoing it will readily be seen by those skilled in the art that the present invention capitalizes upon the co-action between a wear resistant search shoe scanning surface and means which greatly reduce the frictional wear inherently imposed upon the scanning surface. Therefore the present invention will admit of embodiments other than that one exemplary embodiment which has been illustrated and described.

In the arrangement of FIGURE 4, for example, it will be noted that outriggers 13 and shim 11 do not have wear resistant coatings, leaving the arcuate surface 22 as the exposed end of outriggers 13. Accordingly, tubular member 15 will be in direct contact with the face of shim 11 and the longevity of the search shoe therefore depends entirely upon the fact that faces 22 of outriggers 13 lie just within the cylindrically curved plane defined by the face of shim 11 thereby shifting some frictional wear from shim 11 to outriggers 13, as described previously.

In the arrangement of FIGURE 4A, for further example, the arcuate surface 22 at the exposed end of outrigger 13 is without a wear resistant coating. The presence of a wear resistant coating 19 on the shim 11, in the arrangement of FIGURE 4A, bonded thereto by lamina 20, serves to reduce the wear on the shim 11 and prolong its life to a lesser extent than the arrangement of FIGURE 3, since there is less surface area with a wear resistant coating in contact with the tubular member 15.

In the arrangement of FIGURE 4A, the surface 22 of outriggers 13 lie in the cylindrically curved plane defined by surface 12 of shim 11, thereby distributing the frictional wear over both faces 22 and surface 12, as previously described. Thus, the longevity of the embodiment illustrated in FIGURE 4A depends upon surface 12 which comprises wear resistant coating 21, formed of any of the above mentioned compositions, for example, and bonding lamina 20. The surface 12 is protected from wear causing high friction with the tubular member 15 by the outriggers 13 taking up at least a part of the shoe-on-tube bearing load.

While the embodiments shown in FIGS. 1 through 4A have many advantages, certain types of inspection operations require even more rugged and dependable equipment. The several parts that join together to align the search shoe frequently are misaligned initially or in replacing a part and the guiding cradle surface is misshaped, causing the detection coil to ride unevenly on the tubular member and distort the inspection results. Rapid disintegration of the non-magnetic shim also occurs and replacement of the shim can involve an appreciable "down time" for the equipment.

To avoid such equipment failures an improved search shoe has been developed that has increased inspection life before parts need to be replaced. FIGS. 5 through 9 illustrate one embodiment of the improved search shoe in accordance with the present invention.

As mentioned previously, the accuracy and operating life of inspection equipment, such as in a magnetic flaw detection device utilizing a sensing element (coil, for example) in close proximity to a test specimen, is highly dependent on alignment and spacing of the coil with respect to the test specimen. In the search shoe 1 illustrated in FIGS. 5-9, the problem of accurately forming the aligning cradle with several parts for the tubular member 15 is eliminated by using a guide body 2 manufactured as a single piece, such as by casting the general pattern and forming the appropriate cradle contour with a single machining operation.

Search shoe 1 includes, in addition to guide body 2, a detector element holder 3, spacing means 130 for establishing the position of the detector element holder 3 in guide body 2, and locking means 131 to retain the guide body 2 and detector element holder 3 rigidly together.

The guide body 2 has a side face 40 (FIG. 9) with a cylindrically curved outer surface formed especially to cradle a particular test specimen configuration. In the illustrated embodiment, the test specimen is a tubular member 15, as best shown in FIG. 8, and the guide body side 40 has a centrally disposed rectangular recess 41 that passes through to the opposite guide body side 120. Along the outer edges of guide body side 40 are parallel, longitudinally extending side faces 42 and 43 and end faces 44 and 45. The side faces 42 and 43, and end faces 44 and 45 form a cylindrical surface that is generated by a line rotating about and parallel to the tubular member axis 46 (FIG. 8). The arc of the cylindrical surface of guide body side 42 subtends an angle sufficient to adequately embrace the tubular member 15, approximately 120 degrees, and thereby longitudinally align the guide body 2 in the axial direction of tubular member 15.

The guide body recess 41 has a rectangular opening at side 40 that changes to a larger opening area within guide body 2 having flat walls 50 and 51 at opposite ends that incline outward, longitudinally of guide body 2. Immediately adjacent the change in area of guide body recess 41 are shoulder pockets 52 formed in guide body 2. The shoulder pockets 52 are disposed one adjacent each corner of the rectangular opening of recess 41 and each shoulder 52 has a flat shoulder face 53. The guide body recess 41 also has flat side walls 59 and 60 which are parallel to each other and disposed substantially vertically (as viewed in FIG. 6).

Disposed within guide body recess 41 is the detection element holder 3. Detection element holder 3 has an outer side 60, rectangular in shape and dimensioned to fit within the rectangular opening of guide body recess 41. Detector element holder 3 has a central cavity 121 opening to the surface of side 60 to receive a detection element, such as coil 61 (represented by the hatched block). The surface contour of holder side 60 is cylindrical, developed on a radius $R_1$ from axis 46 (see FIG. 8). Overlying the holder side 60 is a thin cover plate, such as a non-magnetic shim 11 in the case of magnetic inspection apparatus, secured by means of fasteners 63 to the outer side wall adjacent holder side 60.

Holder side 60 and guide body side 40 can have other configurations to match a particular member configuration.

The detector element holder 3 further includes rear end portions 70 and 71 constructed with inclined faces 72 and 73 that flushly contact the guide body recess surfaces 50 and 51, respectively, when the detector element holder 3 is fully inserted in guide body recess 41. In this fully inserted position, detector element holder 3 positions the shim 11 approximately 1/32 of an inch outside the adjacent surface of guide body side 40, including any coating disposed thereon, as will be explained hereinafter. The detector element holder 3 has flat walls 74 and 75 parallel and vertically disposed (as viewed in FIG. 6) to fit snugly in contact with the guide body recess side walls 59 and 60, respectively, while having sufficient clearance to permit the free withdrawal of the detector element holder 3.

The suspension arrangement for detector shoe 1 may take several forms. For example, a pivotally mounted spring-biased suspension may be used, similar to the one shown in FIG. 2. Search shoe 1 can be suspended from a pivotally mounting frame (not shown) connected to an arm 48 secured in a bracket 49 attached to the rear side 80 of detector element holder 3 by suitable fastening means (not shown). The bracket 49 may be free to pivot about arm 48 and a spring-biased suspension system may be used to keep the search shoe 1 in forced engagement with the tubular member 15, while permitting the search shoe 1 to follow the movement of pipe 15, either in transverse or skew deviations.

The guide body 2 and detector element holder 3 are held rigidly together by locking means 131. Locking means 131 consists of studs 81 and 82 fixed at one end on the inclined end walls 50 and 51, respectively, of guide body recess 41 in parallel alignment (as viewed in FIGS. 5 and 6). The detector element holder 3 has apertures 83 and 84 disposed to receive the studs 81 and 82, respectively. Each of studs 81 and 82 is threaded at the end opposite its fixed end to receive a retaining nut 85 that clamps against the rear face 80 of detector element holder 3.

Detector element holder 3 is positioned within the guide body 2 by spacing means 130 that determines the location of outer surface of shim 11, as will be explained hereinafter. The spacing means 130 comprises a spacing rod 87 having an upper end that is threaded and received in an internally threaded insert 88 fixed in rear end portions 71 and 72 of detector element holder 3. The spacing rod 87 has an opposite end with a disc-shaped foot 90 that can be adjusted to flushly engage the pocket shoulder face 53 on guide body 2. Four spacing rods 87 are used in the illustrative embodiment, located approximately adjacent the corners of the holder side 60.

Other combinations of spacing means and retaining means may be utilized to provide a rigid association and the desired alignment between the guide body 2 and the detector element holder 3.

As mentioned previously, one of the critical problems in the design of detector shoes is to decrease the down time and extend the life of the detector shoe before replacement of parts is needed. The crucial part in the search shoe is the cover plate, such as shim 11 in a magnetic detection device, which must be very thin to enable the detection coil 61 to be as close as possible to the surface of the member being tested. The wear resistant coating 12 on the shim 11 cannot be very thick, since increased spacing of the detection coil 61 would adversely affect the detection sensitivity. Thus, only a small reduction in the thickness of the combined wear resistant coating 12 and shim 11 is possible before a new coated shim must be installed.

In accordance with the present invention, the addition of a wear resistant coating to the entire guide body side 40 and the provision for adjustment of the detector element holder 3 in the guide body 2 enables a search shoe to operate for considerable length of time with only regular adjustment.

The guide body side 40, including edge faces 42 and 43 and end faces 44 and 45 have a substantial thickness of a wear resistant coating 100, such as a ceramic (aluminum oxide, zirconium silicates, chrome oxide, etc.), The guide body 2 takes a substantial amount of the engaging force of the search shoe 1 on tubular member 15, wearing down coating 100, when the surface of shim coating 12 is spaced from or slightly in contact with the tubular member 15. In such an arrangement the contact surface of shim coating 12 is disposed on a radius $R_2$ from axis 46 of tubular member 15 (referring to FIG. 8) which is slightly greater than the radius $R_3$ for the surface of the guide body coating 100.

The detector element holder 3 can be positioned to locate the surface of shim coating 12 in the aforementioned position, as illustrated in FIG. 7, by adjusting the spacing rods 87 equally to the proper length and tightening the retaining nuts 85 to clamp the detector element holder 3 and guide body 2 together. The guide body coating 100 wears down when the search shoe 1 is used and regular adjustment of the detector element holder 3 to position the surface of shim coating 12 spaced from or in slight contact with the tubular member 15 enhances the life of the search shoe 1 considerably. The guide body coating 100, being substantially thicker than shim coating 12, will continue to wear away and guide body 2 will take an appreciable portion of the engaging force and wear.

As mentioned previously, the reason for setting the surface of coated shim 11 very slightly behind the guide body coating 100 (as viewed in FIG. 7) is because most wear resistant coatings, such as ceramics, do not have an absolute flat and homogeneous surface. Rather, the surface is made up of small "peaks" and "valleys." Consequently, the peaks of guide body coating 100 will wear off rather rapidly. If the surface of shim coating 12 is even with guide body coating 100, the shim coating 12 will be worn down and even this small wear cannot be tolerated. For this reason, the surface of shim coating 12 is spaced a slight distance relative to the surface of the guide body coating 100. After the "wear in" period the shim is reset to a closer spacing or in slight contact with the tubular member 15.

A convenient apparatus for precisely adjusting the position of the surface of shim coating 12 is illustrated in FIGS. 5 and 6. The apparatus includes a jig 110 comprising a tubular section 111 equipped with mounting studs 112, clamps 113 and retainer nuts 114. In setting up the search shoe 1, the guide body 2 is first clamped to the tubular section 111 by clamps 112 with the detector element holder 3 free to move therein. A built up area 115 on the surface of jig tubular section 111 is in the form of a chrome plated surface having the same longitudinal length as the length of detector element holder side 70 and a curved surface that matches the contour of the surface of shim coating 12 with a predetermined coating thickness equal to the desired spacing between the surface of shim coating 12 and the surface of guide body coating 100. The retainer nuts 85 for the locking means 131 are then tightened securely and the spacing rod 87 of the spacing means 130 are adjusted to extend spacing rod foot 90 into firm contact with the shoulder face 53. The search shoe 1 is then ready for operation, as illustrated in FIGS. 7 and 8, with the surface of shim coating 12 disposed slightly behind the surface of guide body coating 100.

Another important feature of the present invention is the large surface area of wear resistant coating on guide body 2, on its end faces 44 and 45 and on the side faces 42 and 43. The single piece construction eliminates any problem of aligning separate parts to form the cradle that acts as a guiding surface for search shoe 1 on the tubular member 15. Regular adjustment of the search shoe 1, positioning the detector element holder 3 for minimum wear on the coated shim 11, greatly extends the operating life of the search shoe 1 and decreases the number of serious cases of excessive wear caused when the shim 11 is worn completely through and the coil 61 is damaged. The large area of contact with the tubular member 15 afforded by the single piece guide body 2 also serves to decrease the wear on the coated shim 11. This result is based on the fact that ceramic coatings have a better wear resistant characteristic the greater the area of ceramic in contact with the test specimen.

While the present invention has been described with several selective embodiments, it must be realized that other modifications of these embodiments in accordance with the basic teachings of the present invention are expected. Accordingly, the scope of the present invention is not to be limited by the preferred embodiments shown herein. These changes are part of the present invention described in the appended claims.

What is claimed is:

1. A search shoe for riding on an elongated member during relative movement therebetween and arranged for continuous use and extended life, comprising:

a body having a side contoured to mate with the surface of the elongated member and of sufficient dimension to at least partially encompass the elongated member and guide said body in constant alignment with the elongated member;

said body side being arranged for forceable engagement with the elongated member in sliding contact and having a wear resistant surface, said body member having a cavity opening into said body side;

a detector element holder disposed in said cavity and having a scanning surface contoured to mate with the outer surface of the elongated member, said scanning surface being made of a wear resistant material;

fastening means securing said detector element holder in said body cavity with the scanning surface arranged to confront the outer surface of the elongated member, said fastening means including means for adjusting the relation of said detector element holder to said body to permit locating said scanning surface at a spaced position or in slight contact with the outer surface of the elongated member.

2. A search shoe as described in claim 1, wherein:

said fastening means includes adjustable spacing members that position said detector element holder in said body cavity in spatial relation to said body, and separate retaining means to rigidly retain said detector element holder and body together in fixed relationship, said retaining means being movable to permit adjustment of said spacing members to reposition said detector element holder and scanning surface in relation to said body and upon adjustment of said spacing members to rigidly retain said body and said detector element holder together in the new position.

3. In a search shoe having a scanning surface adapted to forceably engage and slideably pass over an elongated cylindrical member, the improvement comprising, in combination:

a transducer means having a scanning surface shaped for mating with the surface of the elongated member;

abutting members having mating surfaces coextensive with the mating surface of said transducer means and disposed along opposite sides of said transducer means;

means for adjusting the distance between the transducer means and the cylindrical member, and upon adjustment for holding said abutting members in fixed relation to said transducer means such that the coextensive mating surfaces on said abutting members lie just within the cylindrically curved plane defined by the mating surface of said transducer means, the surfaces of said abutting members relieving at least some of the pressure from the surface of said transducer means, whereby the wear of the surface of said transducer means is reduced.

4. In a search shoe, as described in claim 3, wherein the mating surfaces of said abutting members are covered with wear-resistant material.

5. In a search shoe, as defined in claim 3, wherein the mating surfaces of said abutting members are covered with a ceramic composition.

6. In a search shoe having a scanning member adapted to forceably engage and slidably pass along an elongated cylindrical member, the improvement comprising, in combination:
- a cylindrically curved scanning member;
- a search coil disposed adjacent said scanning member;
- a wear-resistant coating overlying and in contact with said scanning member thereby defining a cylindrically curved plane to conform against said cylindrical member;
- abutting members disposed on opposite sides of said scanning member and having wear resistant ceramic surfaces located to conform to and slide along said cylindrical member;
- means for adjusting the distance between the scanning member and the cylindrical member, and upon adjustment for holding said abutting members in fixed relation to said scanning member such that said abutting members both help guide said scanning member along said cylindrical member and reduce wear on said wear resistant coating overlying said scanning member; and
- means for holding both said scanning member and said abutting members adjacent said cylindrical member in scanning position.

7. In a search shoe having a scanning surface adapted to forceably engage and slidably pass over an elongated cylindrical member, the improvement comprising, in combination:
- a search coil;
- a protective member adjacent said search coil having a cylindrically-curved scanning surface for mating with the elongated member;
- at least one abutting member having at least one bearing surface adjacent the entire periphery of the scanning surface of said protective member, said bearing surface being shaped to conform to the surface of said cylindrical member and help guide said search shoe along said cylindrical member; and
- means for adjusting the distance between the protective member and the cylindrical member, and upon adjustment for holding said abutting member in fixed relation to said protective member, said abutting member being positioned to relieve at least some of the pressure from the surface of said protective member during relative movement with respect to the surface of the elongated member.

8. A search shoe, as described in claim 7, wherein: said bearing surface of the abutting member comprises a ceramic.

9. A search shoe, as described in claim 7, wherein: said bearing surface of the abutting member and said scanning surface comprise ceramic.

10. A search shoe for inspecting an elongated member, comprising:
- a single piece guide body having a contoured side face adapted to mate with the outer surface of the elongated member to continuously align said guide body and the elongated member;
- a wear-resistant coating disposed over and secured to the guide body side face adapted to engage the elongated member;
- said guide body having a recess opening into said side face and having internal shoulders, said side face being contoured to mate with the outer surface of the elongated member substantially entirely around the periphery of said recess;
- a magnetic detection unit disposed in said guide body recess comprising a holder,
  - said holder having a cavity at one side for accepting a sensing coil device,
  - a thin non-magnetic shim overlying said cavity and fixed to said holder,
  - said shim having a wear-resistant coating on its outer surface;
- adjustable spacing members extending from said holder to engage with said guide body internal shoulders and position said detection unit in said guide body recess so that said coated shim surface confronts the outer surface of the elongated member in an adjustable position in relation to said guide body side face; and
- retainers secured to said guide body to rigidly secure said guide body and detection unit together in fixed relation upon adjustment of said detection unit in relation to said guide body by said spacing members,
  - said retainers being releasable to permit repositioning of said detection unit in relation to said guide body by said spacing members.

References Cited

UNITED STATES PATENTS

| | | | |
|---|---|---|---|
| 2,746,012 | 5/1956 | Price | 324—37 |
| 2,998,566 | 8/1961 | Cochran | 324—37 |
| 3,025,460 | 3/1962 | Callan | 324—37 |

OTHER REFERENCES

McMaster, R. C., Nondestructive Testing Handbook, New York, the Ronald Press Company, 1963, vol. 2, section 38.34–38.36, copyright 1959.

RUDOLPH V. ROLINEC, *Primary Examiner.*

R. J. CORCORAN, *Assistant Examiner.*